Nov. 21, 1933.  D. T. HARBISON  1,935,978
VALVE
Filed July 11, 1932
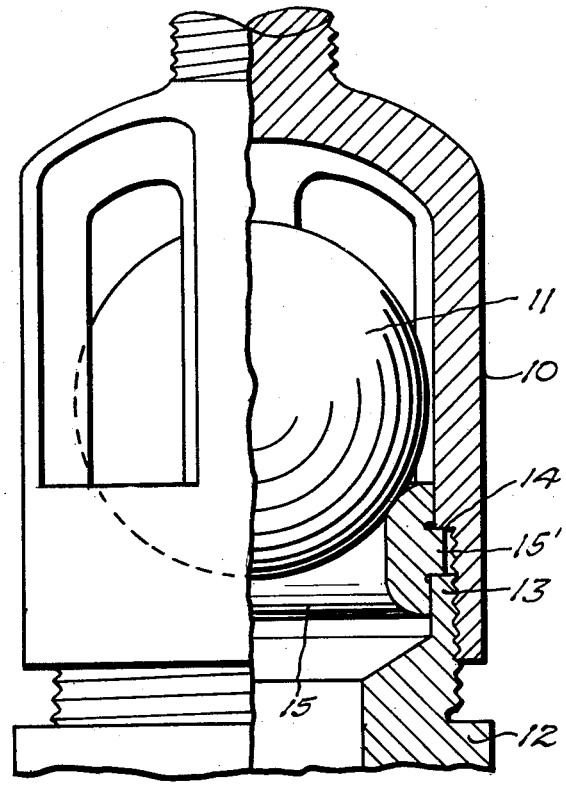
Fig. 1
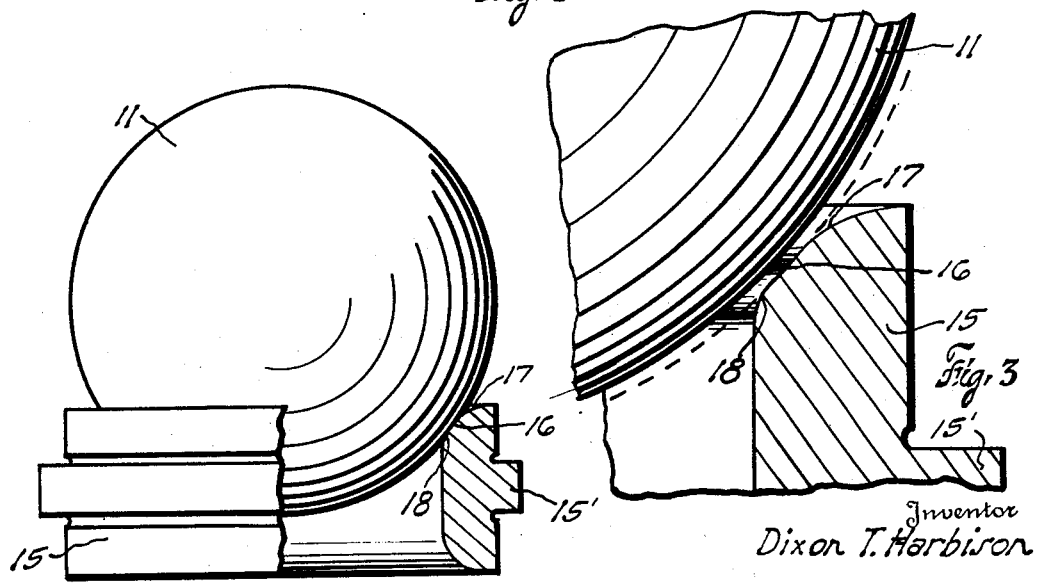
Fig. 2
Fig. 3
Inventor
Dixon T. Harbison
By Jack A. Schley
Attorney Patented Nov. 21, 1933

1,935,978

UNITED STATES PATENT OFFICE 1,935,978

VALVE

Dixon T. Harbison, Fort Worth, Tex., assignor to Petroleum Equipment Company, Fort Worth, Tex., a corporation of Texas Application July 11, 1932. Serial No. 621,822

2 Claims. (Cl. 251—121)

This invention relates to new and useful improvements in valves.

The invention has to do with valves such as are used in pumping oil wells and are referred to as ball valves or drops. In order to better explain the invention, it is believed a short explanation of the difficulties to be overcome will be helpful.

Mechanical engineers in the oil fields have calculated that in the average oil well the ball drops upon its seat approximately 854,000 times in each month, with a liquid weight of from 2000 to 4000 pounds upon the ball at each stroke of the pump. The fluid which passes through the seat and around the ball tends to cause corrosion, abrasion and erosion, and these each present a problem.

Sand, which is usually fine and flint-like, carried through the seat by the oil and gas causes abrasion and cuts out the seating surface where the ball seats. The fluid which carries sand also includes salt water, which is often like brine, as well as sulphur and oil. These constituents in most cases are under great pressure and the erosion which is thus caused washes away the seating surface, thereby destroying the seat. Usually oil contains sulphur; while gas includes chloride, and salt is present in the water, all when combined making a mixture which causes corrosion and erosion, and with the sand, extreme wear.

The valves now in common use have either a concaved annular seat or an angular or inclined seat. Gas is usually present and the pressure of the gas tends to lift the ball from its seat, causing it to flutter or dance. As a rule there is no guide and the ball or drop is free to move laterally. If the ball moves out of its axial path, it will contact the upper edge of its concaved seat, which having been subjected to the corrosion and erosion, will flake off and break down when impacted by said ball. This condition is aggravated by the sharp sand and it is almost impossible to prevent leaking and maintain proper seats under ball valves.

One object of the invention is to provide an improved valve seat so constructed as to overcome the objections and imperfections hereinbefore set forth.

A particular object of the invention is to provide a seat having a guiding surface in the seat itself by giving to the upper portion of the seating surface a convex shape and merging this into a narrow concaved seat, from the lower portion of which a second concave surface extends; whereby the upper convex surface acts as a guide and lowers the ball gradually into the concaved seat, and also whereby sharp edges and corners are eliminated both above and below the seat proper. Such an arrangement reduces the bad results of abrasion and erosion by the elimination of sharp edges and corners. It also gives the entire seat a streamline effect, which promotes the flow of fluids, particularly when under high pressure.

A construction designed to carry out the invention will be hereinafter described together with other features of the invention.

The invention will be more readily understood from a reading of the following specification and by reference to the accompanying drawing in which an example of the invention is shown, and wherein:

Figure 1 is a view partly in elevation and partly in section, showing a valve seat constructed in accordance with the invention, Figure 2 is a view of the ball and seat, partly in elevation and partly in section, and Figure 3 is an enlarged detail illustrating the contour of the seat.

In the drawing the numeral 10 designates an ordinary valve cage, 11 the ball and 12 the valve case. The case has the usual upstanding flange 13, which is externally screw-threaded to receive the lower end of the cage 10, which is also screw-threaded and provided with an internal shoulder 14.

I provide an annular valve seat ring 15, which has the usual circumferential boss 15'. This ring fits snugly within the flange 13 and the cage 10 and has its boss securely clamped on the upper end of the flange by the shoulder 14. All of the foregoing is of the usual construction and has been set forth in the way of explanation and forming no essential part of the invention.

In carrying out the invention, the ring is provided with an annular concaved seat 16, which has its upper portion merged into a convex guide surface 17, while its lower portion is merged into a convex relief surface 18. It is pointed out that the concaved seat 16 is narrow and is also comparatively shallow.

The convex seat has its concavity cut on substantially the same radius as that of the ball 11 and in order to assure a proper seating, the ball is lapped into the seat 16 when the ring is constructed. This assures a tight seal and also eliminates sharp edges at the intersections with the convex surfaces 17 and 18, although in forming the seat care is taken to eliminate such sharp edges.

When the ball 11 falls, it will uniformly seat in the concave surface 16 if it falls along the true vertical axis of said seat. If the ball is out of line when it falls, it will strike the convex guide 17 which will immediately guide it into the seat 16. It has been found that the metal to metal contact between the ball and the guide surface 17 causes the latter to wear bright and smooth, and thus progressive corrosion is not set up.

The convex relief surface 18 is useful in that it forms part of the general streamline shape and it also acts to shed particles of sand and other matter which might lodge below the seat proper. The relief surface 18 also gives clearance below the seat 16 and co-acts with the guide surface 17 in providing a clean and tight seat.

By observing Figure 3, it will be seen that the convex surface 17 may have a radius or curvature such as to limit the lateral movement of the ball 11 and thus more quickly guide it to the seat 16. The provision of the concaved seat 16 has proved to be beneficial not only in eliminating general wear and reducing corrosion and erosion, but in providing a defined seating area which the ball more readily finds and in which it provides a better seal.

It will be noted that the convex guide surface 17 is much broader than the relief surface 18. This arrangement is quite important because the surface 17 acts to guide the ball to its seat 16, while the relief surface, being comparatively steep, will readily shed sand or any other obstruction which might tend to lodge thereon.

The description which has been given recites more or less detail of a particular embodiment of the invention, which is set forth as new and useful, however, I desire it understood that the invention is not limited to such exact details of construction, because it is manifest that changes and modifications may be made, within the scope of the appended claims, without departing from the spirit of the invention.

What I claim and desire to secure by Letters Patent, is:

1. A valve comprising, a seat ring having a narrow concaved annular seat and a guide surface curving outwardly and upwardly from said seat, and a valve ball adapted to rest on the narrow seat and having its major portion above and overhanging said seat and guide, whereby said ball may be moved laterally from its seat, the ring curving downwardly and away from the seat, the ball having a large portion of its surface exposed below the seat, whereby it is more readily dislodged from its seat.

2. A valve comprising, a seat ring having annular convex guide and relief surfaces and a concaved seat considerably narrower than the guide and relief surfaces and disposed therebetween, and a ball valve engaging said seat, whereby more than nine-tenths of its surface is exposed and whereby said ball may move laterally from said seat.

DIXON T. HARBISON.